US012015751B2

(12) United States Patent
Swihart et al.

(10) Patent No.: US 12,015,751 B2
(45) Date of Patent: Jun. 18, 2024

(54) CONTACT IMAGING OF STANDARDS WITH ILLUMINATION

(71) Applicant: Bio-Rad Laboratories, Inc., Hercules, CA (US)

(72) Inventors: Stephen Swihart, Walnut Creek, CA (US); Evan Thrush, San Anselmo, CA (US); Carl Marlowe, San Francisco, CA (US); Kenneth Oh, Pleasant Hill, CA (US); Michael Griffin, El Cerrito, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 0 days.

(21) Appl. No.: 18/082,330

(22) Filed: Dec. 15, 2022

(65) Prior Publication Data

US 2023/0199130 A1  Jun. 22, 2023

Related U.S. Application Data

(60) Provisional application No. 63/291,866, filed on Dec. 20, 2021.

(51) Int. Cl.
*H04N 1/10* (2006.01)
*G06T 5/50* (2006.01)
(Continued)

(52) U.S. Cl.
CPC ............ *H04N 1/1008* (2013.01); *G06T 5/50* (2013.01); *G06V 10/141* (2022.01); *H04N 1/02865* (2013.01); *G06T 2207/20221* (2013.01)

(58) Field of Classification Search
CPC .... A61B 5/0071; G01J 1/0403; G01J 1/0407; G01N 15/1463; G01N 2021/1776;
(Continued)

(56) References Cited

U.S. PATENT DOCUMENTS 6,621,411 B2 * 9/2003 McCarthy ............... E05B 85/12
340/506
6,677,936 B2 * 1/2004 Jacobsen ............. H04M 1/0281
396/374

(Continued)

FOREIGN PATENT DOCUMENTS

WO        2021/231205 A1     11/2021

OTHER PUBLICATIONS

U.S. Appl. No. 63/450,905, filed Mar. 8, 2023.
(Continued)

*Primary Examiner* — Negussie Worku
(74) *Attorney, Agent, or Firm* — Kilpatrick Townsend and Stockton LLP

(57) ABSTRACT

Systems and methods for contact imaging of stands with illumination are disclosed herein. A contact imaging system can include a contact imager. The contact imager can include a housing having a base and a lid. The lid can have a closed position against the base and an open position. The contact imager can include a contact area image sensor. The lid can shield the contact area image sensor from ambient light when the lid is in the closed position. The contact imager can include an illuminator that can illuminate at least a portion of a blot on the contact area image sensor when the lid is in the closed position.

22 Claims, 11 Drawing Sheets

(51) Int. Cl.
*G06V 10/141* (2022.01)
*H04N 1/028* (2006.01)

(58) Field of Classification Search
CPC ....... G01N 2021/6439; G01N 21/6428; G01N 21/6456; G01N 21/76; G01N 2201/064; G01N 33/5302; G06T 2207/20221; G06T 5/50; G06V 10/141; H04N 1/02865; H04N 1/1008; H04N 1/0032; H04N 1/00347; H04N 1/00954; H04N 1/00957; H04N 1/32502; H04N 1/32512; H04N 1/32529; H04N 1/3255; H04N 2201/001; H04N 2201/0039; H04N 2201/0094; H04N 2201/0098; H04N 2201/3204; H04N 2201/3214; H04N 2201/3222; H04N 2201/3274; B32B 2037/0061; B32B 2037/0069; B32B 37/0053; B32B 37/142; B32B 37/185; B32B 38/18; B32B 43/006; B65H 2301/51122; B65H 2513/40; B65H 2513/42; B65H 2801/27; B65H 3/0669; B65H 5/301; B65H 5/305; B65H 7/02; G06F 3/1204; G06F 3/1205; G06F 3/1257; G06F 3/1288; B41J 11/46; B41J 29/02; B41J 29/38
USPC ........................................................ 358/474
See application file for complete search history.

(56) References Cited

U.S. PATENT DOCUMENTS

| | | | |
|---|---|---|---|
| 7,626,739 B2 * | 12/2009 | Tregoning | H04N 1/00551 |
| | | | 358/487 |
| 8,569,980 B2 * | 10/2013 | Yang | B65F 1/1638 |
| | | | 318/264 |
| 9,063,397 B2 * | 6/2015 | Johnson, Sr. | G03B 17/56 |
| 9,389,315 B2 * | 7/2016 | Bruder | G01S 7/4816 |
| 9,625,640 B2 | 4/2017 | Aronson et al. | |
| 9,933,565 B2 | 4/2018 | Swihart et al. | |
| 11,035,722 B2 | 6/2021 | Barak | |
| 2012/0105371 A1 * | 5/2012 | Hotelling | G06F 3/04164 |
| | | | 345/174 |
| 2014/0185111 A1 * | 7/2014 | Yamasaki | H04N 1/1017 |
| | | | 358/497 |
| 2017/0016829 A1 * | 1/2017 | Swihart | G01N 21/6454 |
| 2019/0186987 A1 * | 6/2019 | Barak | G01J 1/0403 |
| 2020/0120256 A1 * | 4/2020 | Griffin | H04N 23/71 |
| 2021/0302229 A1 | 9/2021 | Barak | |

OTHER PUBLICATIONS

International Search Report and Written Opinion from PCT/US2022/053031 dated Apr. 7, 2023; 9 pages.
Canon; "Contact Image Sensors"; Canon Website; Article [online]; May 2018; retrieved Feb. 24, 2023 from https://web.archive.org/web/20180513030339/http://compo.canon:80/en/product/cis/; 5 pages.

* cited by examiner

CONTACT IMAGING OF STANDARDS WITH ILLUMINATION

CROSS-REFERENCE TO RELATED PATENT APPLICATIONS

The present patent application claims benefit of priority to U.S. Provisional Patent Application No. 63/291,866, filed Dec. 20, 2021, the entirety of which is hereby incorporated by reference for all purposes.

BACKGROUND

Electrophoresis is a technique used in molecular biology and other disciplines to detect the presence of proteins or other analytes in a mixture. Typically, after some preparatory steps, the mixture is placed in "wells" of a gel such as an agarose or polyacrylamide gel. For a protein assay, the gel is subjected to an electric field, which causes the proteins to migrate through the gel. The speed of migration of a particular protein in the mixture through the gel is dependent on the molecular weight of the protein. Proteins having lower molecular weights tend to migrate faster than proteins having higher molecular weights. After a time, the different proteins become separated, since they have traveled different distances through the gel.

The proteins may be tagged with antibodies such that the proteins of interest emit light by chemiluminescence. In some applications, for example in the well-known western blotting technique, the proteins are transferred to a membrane such as a polyvinylidene fluoride (PVDF) or nitrocellulose membrane to form a blot. Historically, (after a few incubation steps) the blot was placed in contact with photographic film of about the same size as the blot. The chemiluminescent light exposed portions of the film, so that the pattern of protein separations was permanently recorded on the film. Recently, electronic imaging is replacing photographic film for this purpose.

Contact imagers have been proposed for reading blot images. In a contact imager, the membrane is placed in contact or effectively in contact with a large semiconductor light sensor such as a CMOS (complementary metal oxide semiconductor) or CCD (charge coupled device) sensor. Light emanated by chemiluminescence reaches the sensor directly, in much the same way as in film-based contact recording. In this method, no shutter or other means is present for blocking light from the sample from reaching the sensor, so the sensor is continuously exposed to chemiluminescent light from the sample. In addition, parts of the blot may emanate much more light than other parts, requiring that the image system have an extremely high dynamic range.

BRIEF SUMMARY

One aspect of the present relates to a contact imaging system. The contact imaging system can include a contact imager. The contact imager can include a housing having a base and a lid. The lid can have a closed position against the base and an open position. The contact imager can include a contact area image sensor. In some embodiments, the lid shields the contact area image sensor from ambient light when the lid is in the closed position. The contact imager can include an illuminator that can illuminate at least a portion of a blot on the contact area image sensor when the lid is in the closed position.

In some embodiments, the illuminator is a component of the contact imager. In some embodiments, the illuminator is separate from the contact imager. In some embodiments, the illuminator can illuminate at least the portion of the blot with visible light.

In some embodiments, the illuminator can be a photo-emitting sheet. In some embodiments, the photo-emitting sheet comprises at least one phosphorescent sheet, and/or in some embodiments, the photo-emitting sheet comprises at least one electroluminescent sheet. In some embodiments, the lid can include at least one retention feature that can receive the photo-emitting sheet and hold the photo-emitting sheet in a desired position. In some embodiments, the at least one retention feature can be a first sheet guide and a second sheet guide. In some embodiments, the first sheet guide and the second sheet guide can together hold a single photo-emitting sheet in the desired position. In some embodiments, the first sheet guide cam hold a first photo-emitting sheet in a first desired position and the second sheet guide can hold a second photo-emitting sheet in a second desired position.

In some embodiments, the illuminator can be or include a 2-D LED array. In some embodiments, the 2-D LED array is located in the lid of the contact imager. In some embodiments, the 2-D LED array can generate illumination at at least one desired frequency.

In some embodiments, the illuminator can be or include a side-lit assembly located in the contact imager. In some embodiments, the side-lit assembly is located in the lid of the contact imager. In some embodiments, the side-lit assembly can include: at least one Light emitting diode (LED) strip including a plurality of LEDs, and a total internal reflection (TIR) layer. In some embodiments, the TIR layer can cover the contact area image sensor when the lid is in the closed position. In some embodiments, the TIR layer can receive light from the LED strip and distribute this light across the contact area image sensor.

In some embodiments, the side-lit assembly further includes a reflecting layer coupled to a top of the TIR layer, and at least one distribution layer coupled to a bottom of the TIR layer such that the at least one distribution layer is between the TIR layer and the contact area image sensor when the lid is in the closed position. In some embodiments, the at least one distribution layer can include a diffusion layer. In some embodiments, the at least one distribution layer further can include a prism layer having a first orientation, and a second prism layer having a second orientation. In some embodiments, the first orientation is orthogonal to the second orientation.

In some embodiments, the contact imaging system can further include at least one processor. The at least one processor can generate a first image of first sample features with the contact area image sensor, which first image is of the resolved sample and is generated with light emitted by chemiluminescence of the sample, and generate a second image of second sample features with the contact area image sensor; the second sample features including standards. In some embodiments, the first image and the second image are the same image. In some embodiments, the first image and the second image are separate images captured at different times.

In some embodiments, the at least one processor can combining the first image and the second image. In some embodiments, the second image is generated with light from the illuminator and transilluminating the sample. In some embodiments, the at least one processor can control the illuminator to transilluminate the sample before generating the second image.

One aspect of the present relates to a method of imaging a sample. The method includes placing a resolved sample on a contact area image sensor, the contact area image sensor located in a base of a contact imager, moving a lid of the contact area image sensor to a closed position, in which closed position the lid prevents ambient light from reaching the contact area image sensor, generating a first image of first sample features with the contact imager, and generating a second image of second sample features while the lid is in the closed position with the contact imager. In some embodiments, the second sample features can be standards. In some embodiments, the first image is of the resolved sample and is generated with light emitted by the sample.

In some embodiments, the sample is electrophoretically resolved, and in some embodiments, the light emitted by the sample is generated via chemiluminescence. In some embodiments, the method further includes illuminating the sample with the illuminator. In some embodiments, the illuminator transilluminates the sample. In some embodiments, the illuminator can be a photo-emitting sheet.

In some embodiments, the method includes coupling the illuminator to the contact imager. In some embodiments, the photo-emitting sheet can be a phosphorescent sheet, and in some embodiments, the photo-emitting sheet can be an electroluminescent sheet. In some embodiments, the lid can include at least one retention feature that can receive the photo-emitting sheet and hold the photo-emitting sheet in a desired position. In some embodiments, the at least one retention feature can be a first sheet guide and a second sheet guide. In some embodiments, the first sheet guide and the second sheet guide can together hold a single photo-emitting sheet in the desired position.

In some embodiments, the illuminator can be a side-lit assembly located in the contact imager. In some embodiments, the side-lit assembly is located in the lid of the contact imager. In some embodiments, the side-lit assembly can include at least one Light emitting diode (LED) strip including a plurality of LEDs, and a total internal reflection (TIR) layer that can cover the contact area image sensor when the lid is in the closed position. In some embodiments, the TIR layer can receive light from the LED strip and distribute this light across the contact area image sensor. In some embodiments, illuminating the sample with the illuminator includes controlling the LED strip to illuminate the sample.

In some embodiments, the side-lit assembly further includes a reflecting layer coupled to a top of the TIR layer, and at least one distribution layer coupled to a bottom of the TIR layer such that the at least one distribution layers is between the TIR layer and the contact area image sensor when the lid is in the closed position. In some embodiments, the at least one distribution layer can include a diffusion layer. In some embodiments, the at least one distribution layer further includes a prism layer having a first orientation, and a second prism layer having a second orientation. In some embodiments, the first orientation is orthogonal to the second orientation.

In some embodiments, the illuminator can be a 2-D LED array. In some embodiments, illuminating the sample with the illuminator can include controlling the 2-D LED array to illuminate the sample. In some embodiments, the 2-D LED array is located in the lid of the contact imager. In some embodiments, the 2-D LED array can generate illumination at at least one desired frequency.

DETAILED DESCRIPTION

Figure 1:
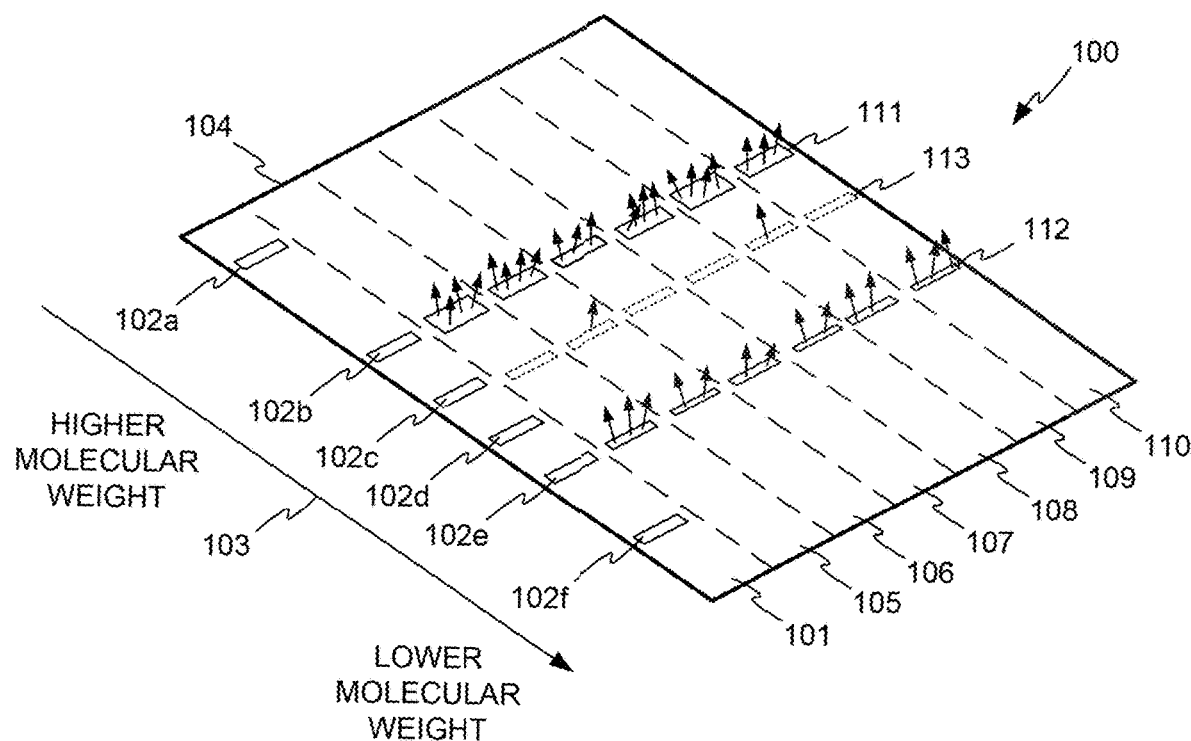
FIG. 1 illustrates a typical blot after separation of proteins, in accordance with embodiments of the invention.

Sample imaging plays a key role in analysis, including, for example, in blot analysis. Blot analysis can use a variety of blot techniques, including, for example, Western Blot, Southern Blot, Northern Blot, dot blot analysis, quantitative dot blot, immunohistochemistry, and immunocytochemistry.

In blot analysis, such as in Western Blot, a sample is applied to a gel or membrane such as via one or several wells. The sample is then electrophoretically resolved. The resolved sample can then be transferred to a membrane for imaging, or can be imaged on the membrane/gel on which the sample was resolved. Via different techniques, the resolved sample can chemiluminesce, and light emitted by the chemiluminescing sample can be captured by a sensor such as an area image sensor.

To facilitate identification of the components of the resolved sample, the gel/membrane on which the sample is imaged can include standards. These standards, can be chemiluminescent, or alternatively can be non-chemiluminescent. In the event that these standards are non-chemiluminescent, it can be extremely challenging to image the standards, especially under lighting conditions that facilitate imaging the chemiluminescent resolved sample.

The present disclosure relates to systems and methods for improving imaging of standards. This includes a contact imager having a body and a lid attached to the body. The lid can be movable between an open position and a closed position. The body can include a contact area sensor. When the lid is in the closed position, the lid can prevent ambient light from reaching the contact area sensor.

When a sample is placed on the contact area sensor and the lid is closed, the contact area sensor can generate one or several images of the resolved sample, and particularly can generate one or several image of the resolved sample via the chemiluminescence of the resolved sample. However, as the standards do not luminesce, one or several usable images of the standards cannot be generated. Embodiments of the present disclosure include an illuminator that illuminates the sample when the lid is closed to thereby enable the generation of usable images of the standards. In some embodiments, this illuminator can be located in the lid of the contact imager and can transilluminate the sample and the standards. A portion of the illumination can be absorbed by the standards as the light passes through the sample, thereby enabling the contact imager to generate an image of standards.

In some embodiments, some or all of the standards can have the same, or different absorption bands. In some embodiments in which some or all of the standards have different absorption bands, the standards can be illuminated with light of containing different frequencies, thereby allowing distinguishing between the standards. In some embodiments, this can include illumination with a broad spectrum light, such as a light having frequencies covering all of the absorption bands. In some embodiments, this can include illuminating the standards with a white light. In some embodiments, the standards can be illuminated with light of one or several target frequencies. This illumination can be simultaneous or in series. For example, three different LEDs, each having a different emission frequency, could simultaneously illuminate the standards. Alternatively, these LEDs could, one-after-the-other (in series) illuminate the standards.

FIG. 1 illustrates a typical blot 100 after separation of proteins, in accordance with embodiments of the invention. One lane 101 of the blot is reserved for protein standards 102a-102f. Protein standards 102a-102f have been separated in direction 103, with lower molecular weight protein standard 102f being farther from edge 104 than higher molecular weight protein standard 102a.

Samples of the mixture to be assayed have been separated in lanes 105-110, resulting in protein bands 111, 112, and 113 in each of lanes 105-110. (The lane divisions shown in dashed lines are for illustration only, and do not appear on a blot.) Protein band 111 emits light strongly, and corresponds approximately to the molecular weight of protein standard 102b. Protein band 112 emits light somewhat less strongly, and corresponds approximately to the molecular weight of protein standard 102e. Protein band 113 corresponds approximately to the molecular weight of protein standard 102c, and emits light very weakly, indicating that very little of the protein in band 113 may be present. Because standards 102b, 102c, and 102e are of known weight, their presence provides information about the molecular weights of the proteins at bands 111, 112, and 113, to assist in identifying the proteins in bands 111, 112, and 113.

As is indicated in FIG. 1, the proteins in bands 111, 112, and 113 are emitting light via chemiluminescence. Protein standards 102a-102f may or may not be chemiluminescent.

Figure 2:
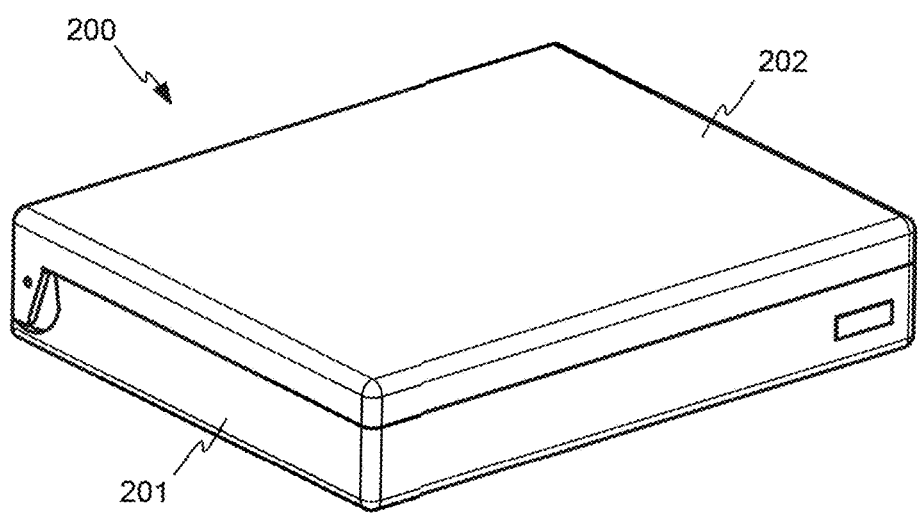
FIG. 2 illustrates an imaging device in accordance with embodiments of the invention, in a closed position.
Figure 3:
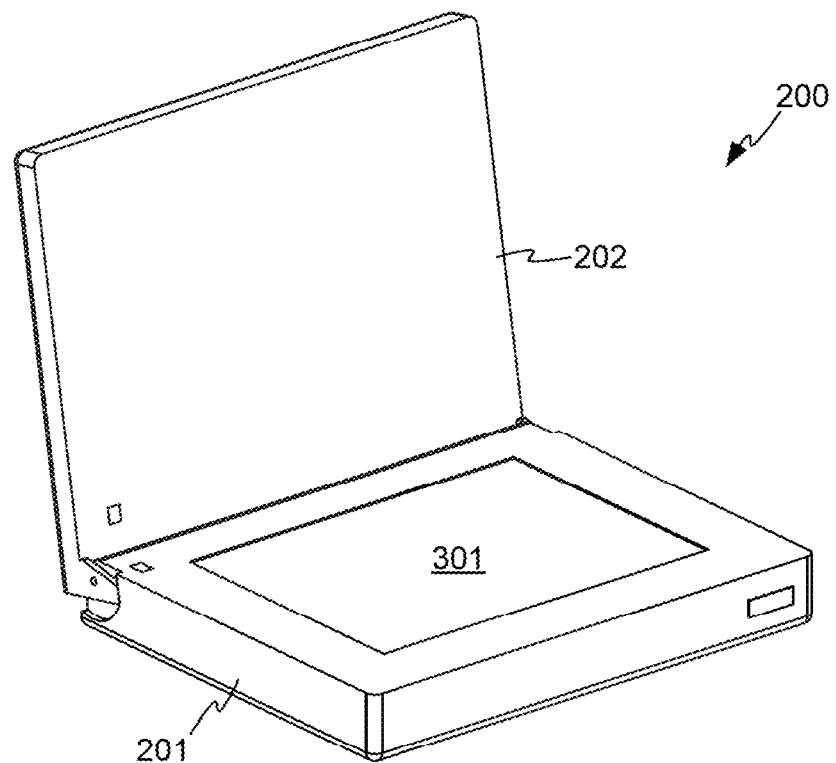
FIG. 3 shows the imaging device of FIG. 2 in an open position.

FIG. 2 illustrates an imaging device 200 in accordance with embodiments of the invention, in a closed position. FIG. 3 shows imaging device 200 in an open position.

Referring to both FIG. 2 and FIG. 3, imaging device 200 includes a base portion 201, also referred to herein as a body 201, and a lid 202. Lid 202 is shown in a closed position in FIG. 2, and in an open position in FIG. 3. A contact area image sensor 301 is disposed in base 201. Contact area image sensor 301 is an example of an electronic array light sensor, and may be, for example, of the kind described in U.S. Patent Application Publication No. 2015/0172526 of Swihart et al., published Jun. 18, 2015 and titled "Non-Destructive Read Operations with Dynamically Growing Images", now U.S. Pat. No. 9,736,388; U.S. Patent Application Publication No. 2016/0006910 of Uri et al., published Jan. 7, 2016 and titled "Contact Imager", now U.S. Pat. No. 9,794,454; U.S. Patent Application Publication No. 2016/0028976 of Ran et al., published Jan. 28, 2016 and titled "Digital Imaging with Masked Pixels", now U.S. Pat. No. 9,774,804; and U.S. Patent Application Publication No. 2017/0016829 of Swihart et al., published Jan. 19, 2017 and titled "Contact Imaging Devices for Fluorescence Applications", now U.S. Pat. No. 9,933,565, the entire disclosures of which are hereby incorporated by reference herein for all purposes.

Contact area image sensor 301 may be, for example, a charge coupled device (CCD) sensor, a complementary metal oxide semiconductor (CMOS) sensor, an organic photodiode sensor, or another suitable kind of sensor. In general, such sensors exploit the property of some semiconductor materials that when the material is struck by light, free electrons are generated in proportion to the intensity of the light. The sensor is divided into specific light-sensitive areas called "pixels". To capture an image, the pixels are reset and then exposed to light for an exposure time. At the end of the exposure time, the amount of charge accumulated in each pixel is measured and converted to a numerical value. An array of these numerical values may be called a "digital image", with each value in the array representing the brightness of the light falling on the corresponding pixel. In the digital image, the values may also be referred to as pixels.

In a CCD sensor, the accumulated charges are shifted off of the sensor to a charge amplifier, the output of which is digitized for each pixel. In a CMOS sensor, the accumulated charge can be read from each pixel directly, without shifting. In some sensors, different pixels are sensitive to different light wavelength bands, enabling color imaging.

In this context, a "contact" sensor is one that receives light directly from locations on the target in contact with a face of the sensor, with 1:1 magnification and without any intervening magnification-changing optics. (There may be other kinds of optical components between the contact surface and the light-sensitive semiconductor layer, for example a fiber faceplate as described in U.S. Patent Application Publication No. 2017/0016829, previously incorporated by reference.) This kind of sensing is analogous to the making of a "contact print" in film photography, in which a photographic negative is placed in direct contact with photo paper and exposed to light. An image is formed on the paper that is the same size as the negative.

Referring again to FIG. 3, contact area image sensor 301 is preferably slightly larger in area than a typical blot, for example about 7×10 centimeters. In other embodiments, contact area image sensor 301 may be about 5×7 inches, 8×10 inches, or 9×12 inches, or another suitable size. Contact area image sensor 301 preferably includes many thousands or even millions of pixels, which are small enough that a digital image captured by contact area image sensor 301 provides a high resolution representation of a target placed on the sensor. For example, each pixel may be about 130 microns square, or another suitable size. A sensor 7×10 centimeters with 130-micron pixels would have about 414,000 total pixels.

Figure 4:
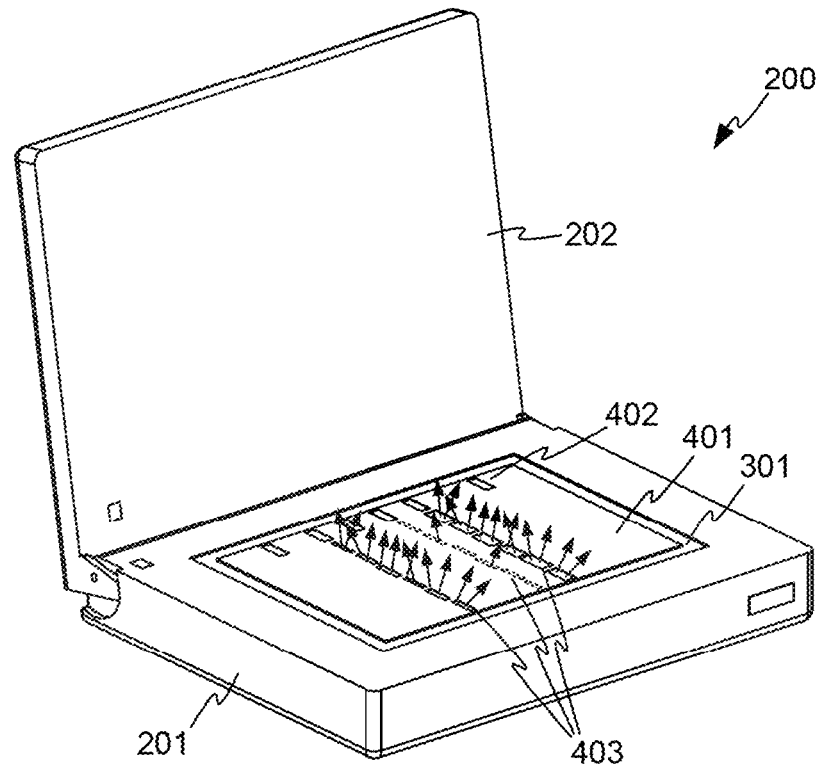
FIG. 4 illustrates a target in the form of a blot similar to the blot of FIG. 1, placed on a contact area image sensor of a device such as the imaging device of FIG. 2.

In FIG. 4, lid 202 has been opened, and a target 401 in the form of a blot similar to blot 100 is placed on contact area image sensor 301. Target 401 includes a lane 402 of protein standards that do not emit light, as well as a number of locations 403 that do emit light by chemiluminescence, indicating the presence of particular proteins that have been separated in the experiment. While only the top surface of target 401 is visible in FIG. 4, the chemiluminescent light is emitted from both sides, and some of the light is directed downward toward contact area image sensor 301.

Once target 401 is in place, lid 202 is closed. Lid 202 shields contact area image sensor 301 from ambient light when lid 202 is in the closed position. With lid 202 in the closed position, digital images can be captured if target 401 using contact area image sensor 301. To capture a digital image, image sensor 301 is flushed of accumulated charge, and then read after a predetermined time called the exposure time. In addition, the act of reading contact area image sensor 301 takes a finite amount of time, as charges must be shifted off of the sensor (in a CCD sensor) or the pixels must be read sequentially (in a CMOS sensor).

In general, portions of target 401 where the chemiluminescence is strongest will appear brighter in the digital image, and portions of target 401 where chemiluminescence is weaker or non-existent will appear darker. The relative strength of the chemiluminescence may permit an approximate quantification of the amounts of different proteins present in the sample.

Figure 5:
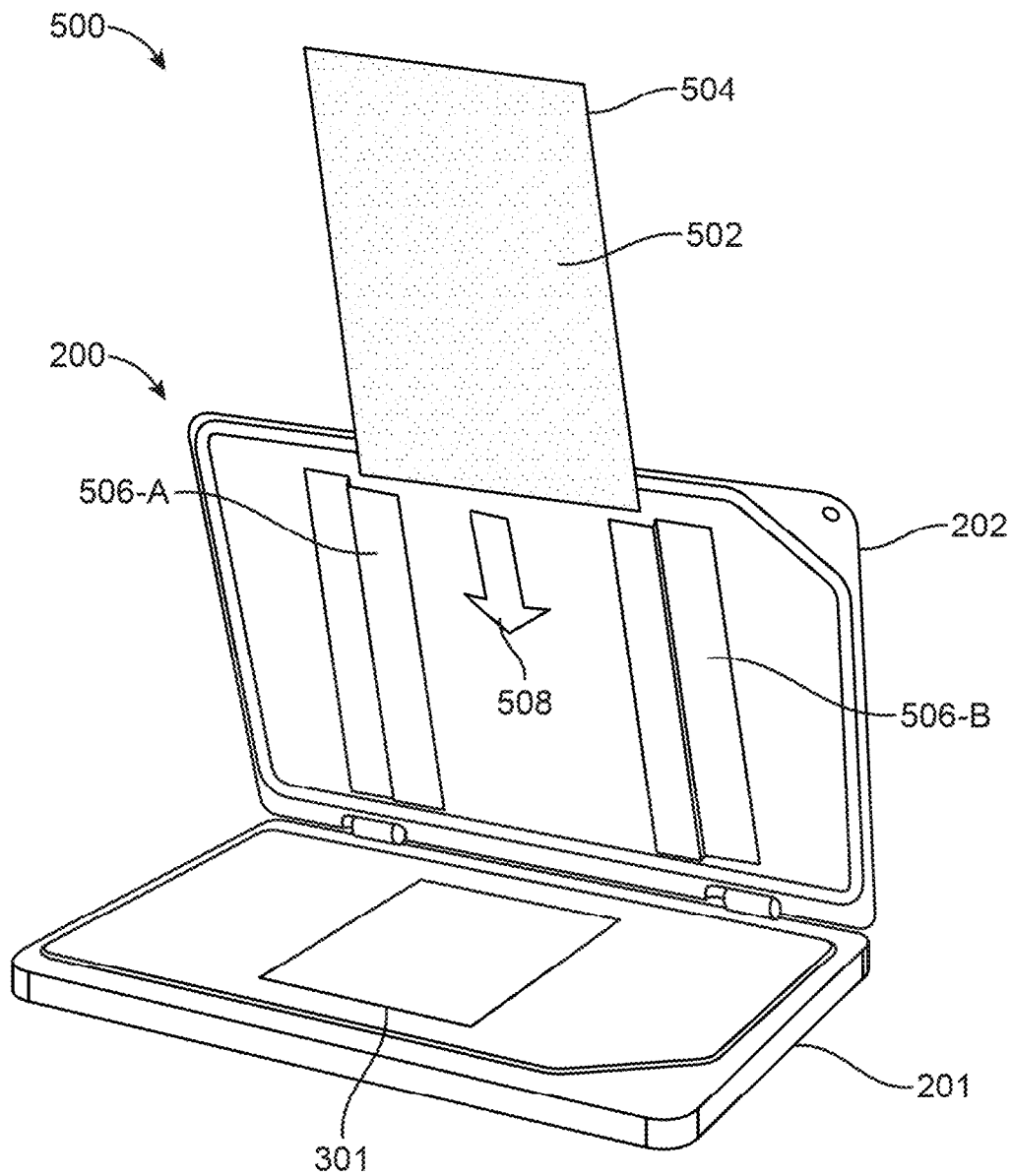
FIG. 5 is a depiction of one embodiment of a contact imaging system.

FIG. 5 depicts one embodiment of a contact imaging system 500. The contact imaging system 500 includes the contact imager 200. The contact imager 200 includes the base 201 and the lid 202. The contact area image sensor 301 is located in the body 201 and, like in previous embodiments, is sized and positioned such that when the lid 202 is in the closed position, the lid 202 prevents ambient light from reaching the contact area image sensor 301.

The contact imaging system 500 further includes an illuminator 502. The illuminator 502 can be configured to generate light, at least when the lid 202 is in the closed position to thereby illuminate the sample and to enable imaging of the standards. The illuminator 502 can be a part of the contact imager 200, or can be separate from the contact imager 200. In the embodiment depicted in FIG. 5, the illuminator 502 comprises a light emitting sheet 504. This can include, for example, a phosphorescent sheet or an electroluminescent sheet.

The light emitting sheet 504 can be a part of the lid 202, or can be coupled to the lid 202. In some embodiments, the light emitting sheet 504 can be detachably coupled to the lid 202 via one or several retention feature configured to receive the light emitting sheet 504 and hold the light emitting sheet 504 in a desired position with respect to the lid. In some embodiments, the one or several retention features can comprise one or several sheet guides 506, and specifically can include a first sheet guide 506-A and a second sheet guide 506-B. The sheet guide 506 can comprise a variety of shapes and sizes and can be made from a variety of materials. In some embodiments, the sheet guide 506 can comprise a plastic or polymer member that can be configured to elastically deform when the illuminator 502 is engaged with the sheet guide 506. In such an embodiment, the restorative forces generated by the sheet guide 506 as a result of the elastic deformation of the sheet guide 506 can secure the illuminator 502 to the lid and/or with respect to the lid 502.

In some embodiments, each of the first sheet guide 506-A and the second sheet guide 506-B are configured to together hold a single light emitting sheet 504 in the desired position on the lid 202 or with respect to the lid 202. In such an embodiment, the light emitting sheet 504 can be retained by the one or several retention features by, for example, sliding the light emitting sheet 504 in a direction as indicated by arrow 508 such that each of the first sheet guide 506-A and the second sheet guide 506-B hold the light emitting sheet 504 against the lid 202.

Figure 6:
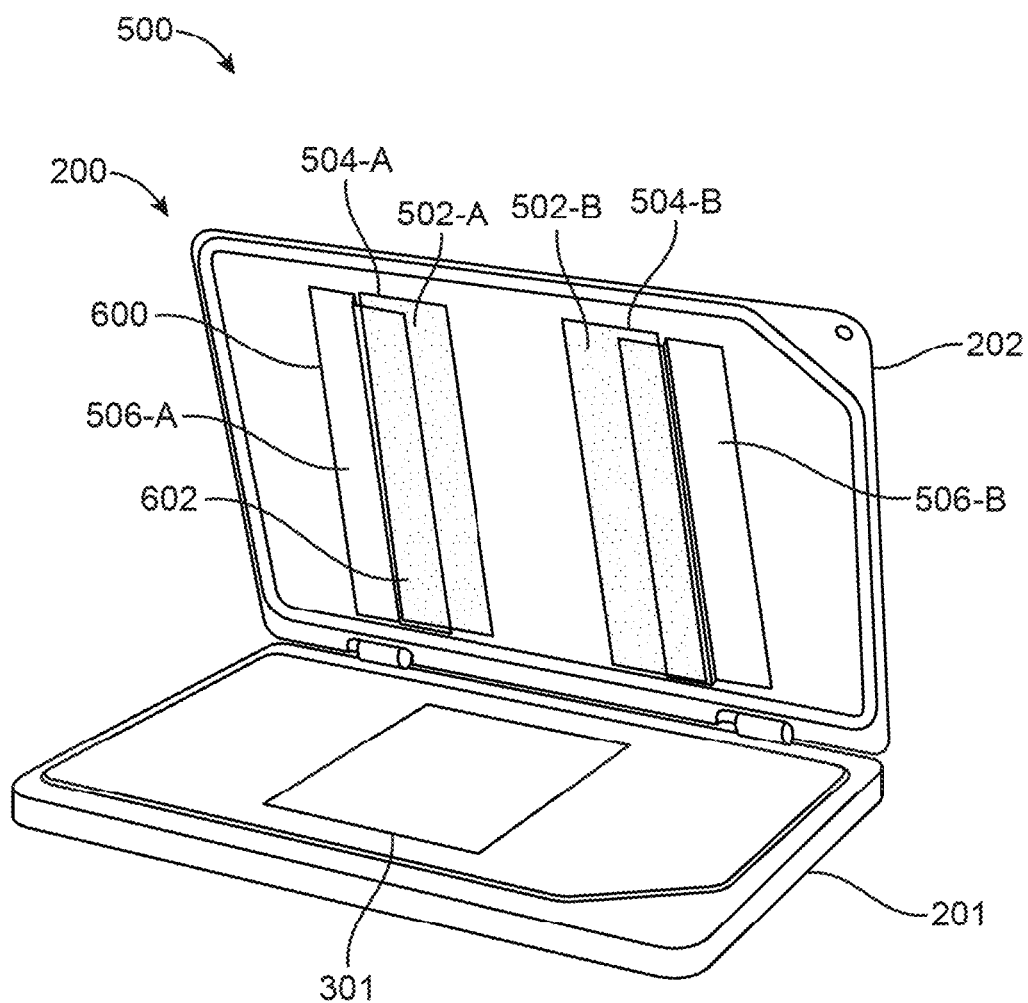
FIG. 6 is a depiction of another embodiment of the contact imaging system.

FIG. 6 depicts another embodiment of the contact imaging system 500. The imaging system includes the contact imager 200 including the base 201, the lid 202, and the contact area image sensor 301. The lid includes an illuminator 502, and specifically includes a plurality of illuminators 502. The illuminators 502 can each comprise a light emitting sheet 504. Specifically, the illuminator 502 can comprise a first illuminator 502-A comprising a first light emitting sheet 504-A and a second illuminator 502-B comprising a second light emitting sheet 504-B. Each of the first light emitting sheet 504-A and the second light emitting sheet 504-B can be for example, a phosphorescent sheet or an electroluminescent sheet.

As shown in FIG. 6, the contact imaging system 500 includes the first sheet guide 506-A and the second sheet guide 506-B. In some embodiments, each of the sheet guides 506 can include a first portion 600 coupled to the lid 202 and a second portion 602 configured to engage with the illuminator 502, and specifically with a light emitting sheet 504. In some embodiments, the first sheet guide 506-A can be oriented in an opposite direction with respect to the second sheet guide 506-B such that the second portion 602 of the first sheet guide 506-A faces the second portion 602 of the second sheet guide 506-B. This orientation of the first sheet guide 506-A and the second sheet guide 506-B forms a channel in which a single illuminator 500 can be inserted as indicated in FIG. 5.

Figure 7:
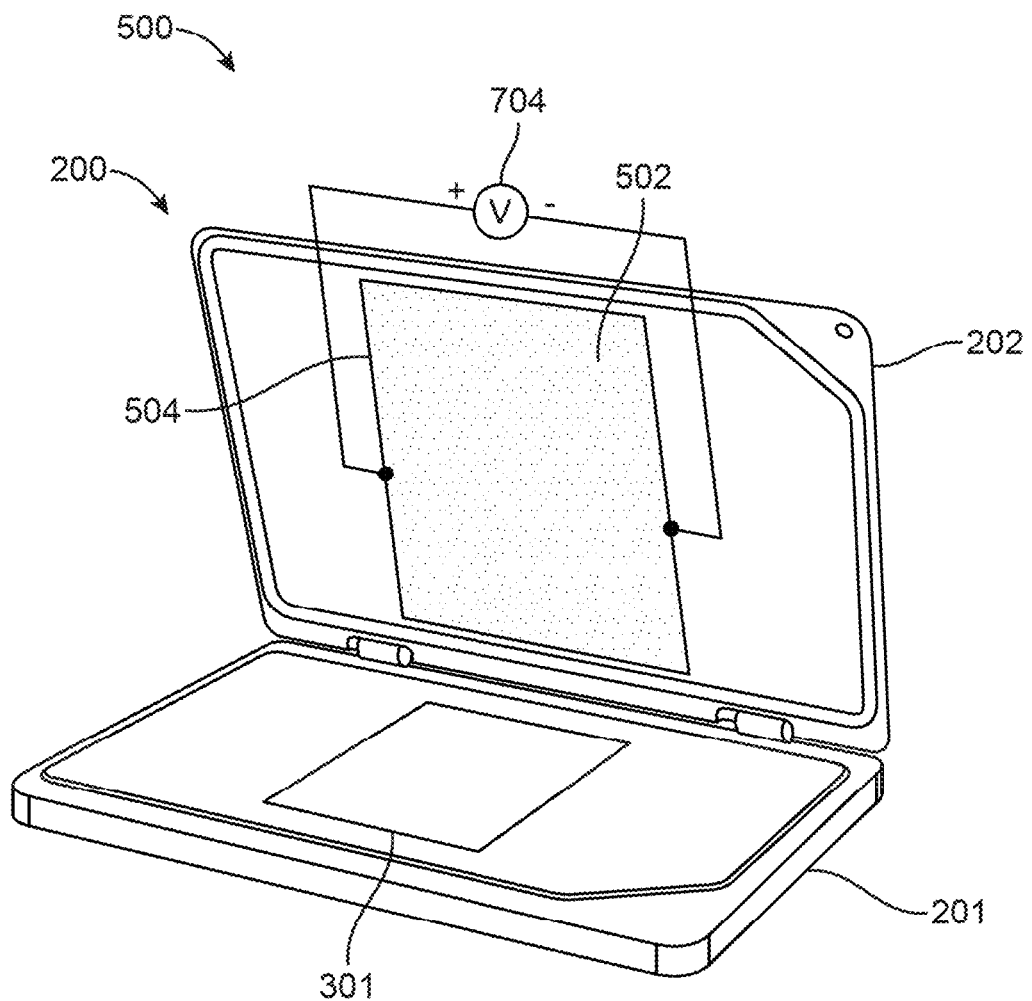
FIG. 7 is a depiction of one embodiment of the contact imaging system with an electroluminescent sheet.

FIG. 7 depicts another embodiment of the contact imaging system 500. The contact imaging system 500 includes the contact imager 200 which includes a base 201, a lid 202, and a contact area image sensor 301. The lid 202 includes an illuminator 502 which can comprise light emitting sheet 504. In the embodiment of FIG. 7, this light emitting sheet 504 can be an electroluminescent sheet which can be coupled to a power supply 704. The power supply 704 can be configured to provide power to the electroluminescent sheet to cause the electroluminescent sheet to emit light. The electroluminescent sheet can be integrated into the lid 202 of the contact imager 200 or can be coupled to the lid 202 of the contact imager 200 via one or several retention features such as one or several sheet guides.

Figure 8:
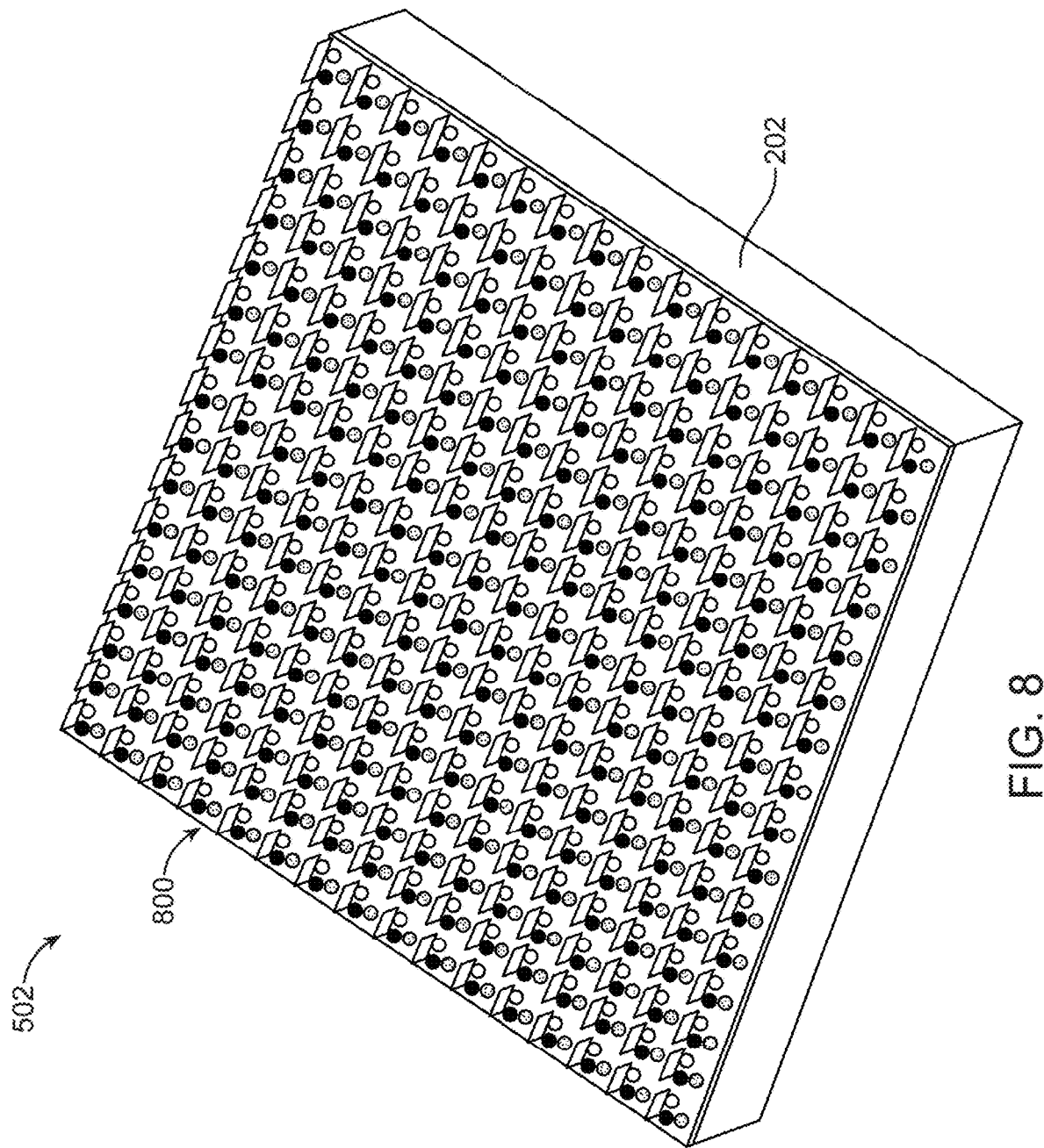
FIG. 8 is a depiction of one embodiment of a 2-D LED array of a contact imaging system.

FIG. 8 depicts another embodiment of a portion of the contact imaging system, and specifically another embodiment of an illuminator 502. Specifically, FIG. 8 depicts an illuminator 502 comprising a 2-D LED array 800. The 2-D LED array 800 can be located in the lid 202 of the contact imager 200. The 2-D LED array 800 can comprise a plurality of LEDs arranged in a two dimensional array. In some embodiments, this 2-D LED array can be a monochromatic array in which the 2-D LED array 800 comprises a plurality of LEDs emitting light of the same frequency or frequencies, and in some embodiments, the 2-D LED array 800 can comprise a non-monochromatic array comprising groups of different LEDs, wherein each group emits light of one or several frequencies different than the light emitted by other groups of LEDs forming the 2-D LED array 800. In some embodiments, the 2-D LED array 800 can include a first group of LEDs comprising red LEDs, a second group of LEDs comprising green LEDs, a third group of LEDs comprising blue LEDs, and/or a fourth group of LEDs comprising ultraviolet LEDs. These different groups of LEDs can be controlled to in series, or simultaneously illuminate the sample and thereby the standards.

In some embodiments, the electroluminescent sheet, the 2-D LED array 800 can be coupled to a power source. In some embodiments, the power source and/or the LEDs in the 2-D LED array 800 can be controlled to thereby control the generation of light by the LEDs in the 2-D LED array 800.

Figure 9:
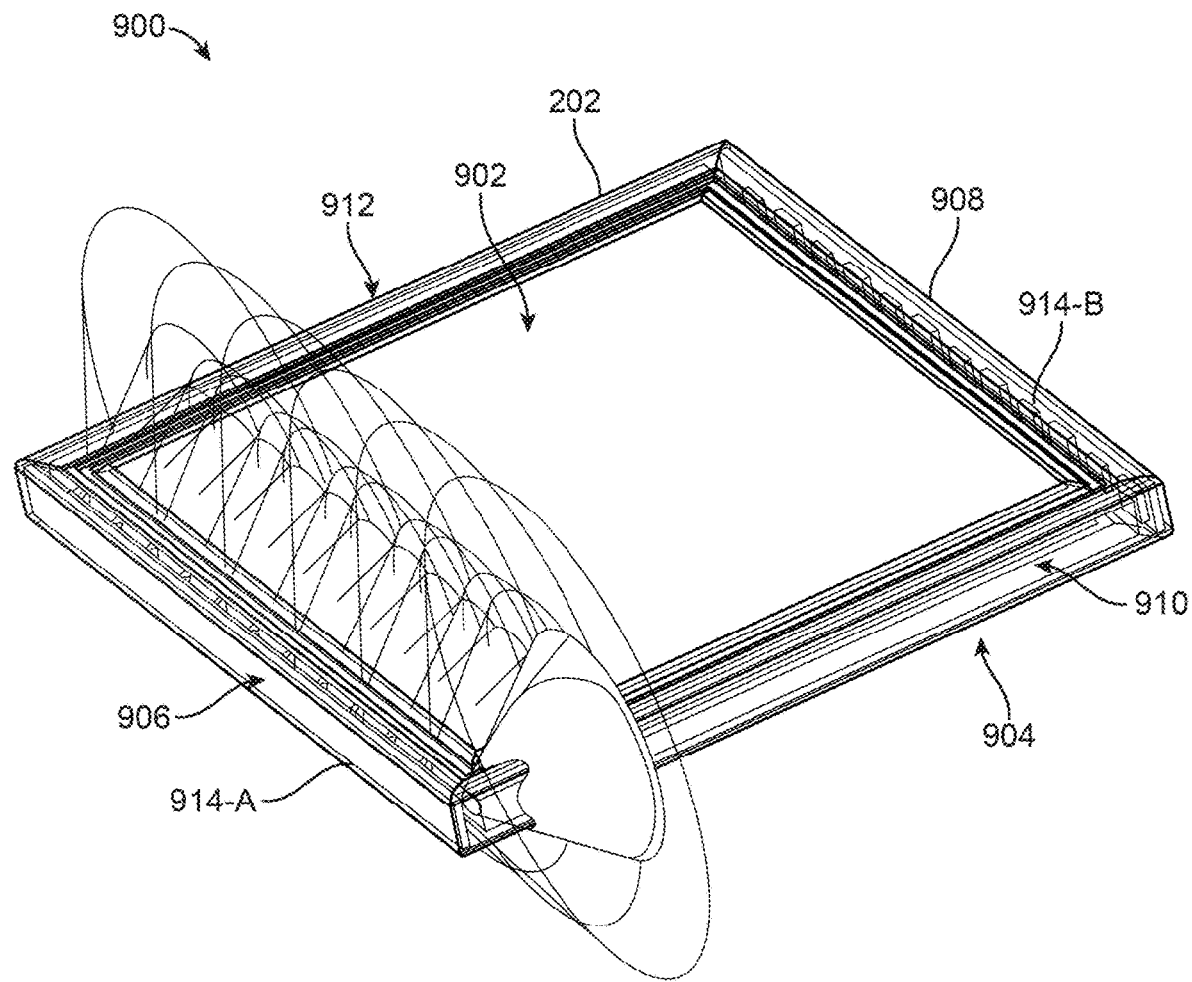
FIG. 9 is a depiction of a side-lit LED assembly of a contact imaging system.

FIG. 9 depicts an embodiment of aspects of a contact imaging system 500, and specifically depicts a lid 202 that can include side-lit LED assembly 900. The side-lit LED assembly 900 can be located in the lid 202 of the contact imager 200. The lid 202 can include a top 902 and a bottom 904. When the lid 202 is in the closed position, the bottom 904 of the lid 202 can contact the contact area image sensor 901. The lid 202 can further include a first side 906 and an opposing second side 908, a third side 910 and an opposing fourth side 912. In some embodiments, the side-lit LED assembly 900 can include one or several LED strips 914 located at the end(s) of one or more of the first side 906, the second side 908, the third side 910, and the fourth side 912. In the embodiment depicted in FIG. 9, the lid 202 includes a first LED strip 914-A located at the first side 906 of the lid 202 and a second LED strip 914-B located at the second side 908 of the lid 202.

Figure 10:
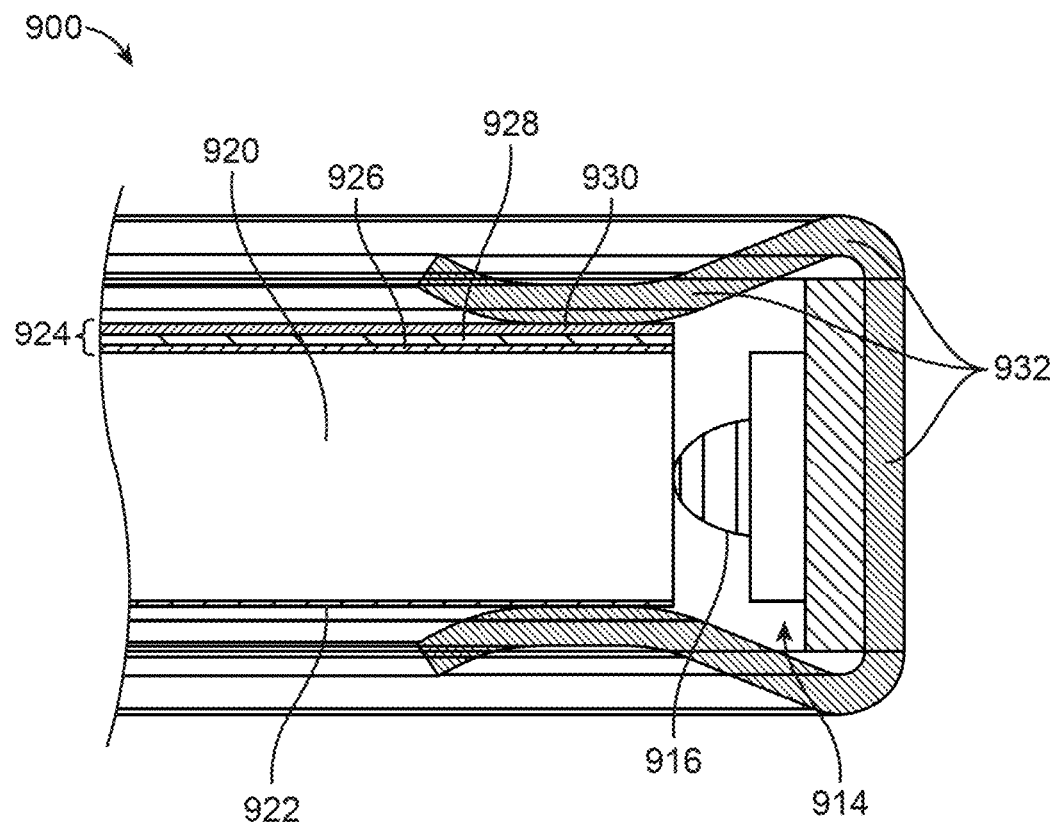
FIG. 10 is a zoomed-in view of aspects of the side-lit LED assembly.

As shown in FIG. 10, the side-lit LED assembly 900 can include the LED strip 914. The LED strip can include one or several LEDs 916. These LED 916 can comprise a plurality of types of LEDs 916, such that the combination of these different types of LEDs 916 emits light of desired frequencies. FIG. 9 depicts cones of light emitted from the LEDs 916 in LED strip 914-A. For example, a single type of LED may only emit a single frequency or a range of frequencies. This single frequency or range of frequencies may not encompass all of the desired frequencies of illumination. Thus, multiple types of LEDs 916 can be included on the LED strip 914 to ensure that the desired frequencies and/or ranges of frequencies of light are emitted. In some embodiments, the LEDs 916 can include a first group of LEDs comprising red LEDs, a second group of LEDs comprising green LEDs, a third group of LEDs comprising blue LEDs, and/or a fourth group of LEDs comprising ultraviolet LEDs. In some embodiments, the LEDs 916, and specifically, the different types of LEDs can have the same emissions cone, and in some embodiments, the LEDs 916, and specifically the different types of LEDs can have different emissions cones. In some embodiments, the LEDs 916 having the same emissions cone can facilitate uniform light distribution across the sample and can facilitate uniform and/or improved imaging. These different groups of LEDs can be controlled to in series, or simultaneously illuminate the sample and thereby the standards.

The side-lit LED assembly 900 can include a plurality of layers receiving light emitted from the LED strip 914. These layers can include a total internal reflection (TIR) layer 920. The TIR layer 920 can extend from the LED strip 914 across the lid 202, and can, in some embodiments, be sized and shaped to cover all or portions of the contact area image sensor 301 when the lid 202 is in the closed position. The TIR layer 920 can comprise a top parallel to and relatively more proximate to the top 902 of the lid 202 than the bottom 904 of the lid 202, a bottom parallel to the top of the TIR layer 920 bottom of relatively more proximate to the bottom 904 of the lid 202 than to the top 902 of the lid 202. One or several sides extend between the top and the bottom of the TIR layer 920. In some embodiments, the TIR layer 920 can be positioned such that a side is adjacent to the LED strip 914 such that light emitted by the LED strip 914 enters into the TIR layer 920 via the side of the TIR layer 920. The light passes through the TIR layer 920 and slowly escapes through the bottom of the TIR layer and illuminates the sample. Thus, in some embodiments, the TIR layer 920 can be configured to receive light from the LED strip 914 and distribute this light to the sample and/or to the contact area image sensor 301.

The TIR layer 920 can comprise, for example, a thin sheet configured for total internal reflection. A top of the TIR layer 920 can contact a reflecting layer 922. The reflecting layer 922 can be positioned on top of the TIR layer 920 such that when the lid 202 is in the closed position, the TIR layer 920 is between the reflecting layer 922 and the contact area imaging sensor 301. The reflecting layer 922 can reflect any light escaping through the top of the TIR layer 920 back into the TIR layer 920 and/or towards the contact area imaging sensor 301. The reflecting layer 922 can comprise, for example, a thin sheet of reflective material attached to the TIR layer 920, such as, for example, a metal and/or metallic layer. In some embodiments, the reflecting layer 922 can comprise an aluminum layer, a Mylar layer such as, for example, a metallized Mylar layer and/or an aluminum coated Mylar layer, a polymer reflective layer which can be, for example, a non-metallic reflective polymer material, or the like.

The bottom of the TIR layer 920 can contact one or several distribution layers 924. The one or several distribution layers 924 can distribute light coming from the TIR layer 920 so as to improve the uniformity of light distribution across the contact area image sensor 301 and/or across the sample. In other words, in some embodiments, the one or several distribution layers 924 can distribute light coming from the TIR layer 920 so that the intensity of the light is uniform. The one or several distribution layers 924 can include a plurality of layers, which can include, for example, a diffusion layer 926, a prism layer 928 and/or a second prism layer 930.

The diffusion layer 926 can be configured to diffuse light so as to ensure more uniform distribution of light across the contact area image sensor 301 and/or across the sample. Specifically, the diffusion layer 926 can be configured to homogenize light across all or portions of the contact area image sensor 301. The diffusion layer 926 can comprise, for example, a diffuser such as, one or several diffusing materials, a film diffusor, a light shaping diffuser, or the like. In some embodiments, the diffusion layer 926 can comprise one or several layers of a polymer material, glass with a rough finish on at least one side, or the like. In some embodiments, the diffusion layer 926 can be applied to the surface of the TIR layer 920.

The distribution layers 924 can further include the prism layer 928. The prism layer 928 can comprise, for example, a vertical prism layer 928. In some embodiments, the prism layer 928 can be coupled to the diffusion layer 926. The diffusion layers 924 can further include a second prism layer 930. In some embodiments, the second prism layer 930 can comprise, for example, a second vertical prism layer 930. In some embodiments, the second prism layer 930 can have a different orientation than the first prism layer 928, and in some embodiments, the second prism layer 930 can be orthogonal to the first prism layer 928.

In some embodiments, the layers 920, 922, 924 of the side-lit LED assembly 900 can be held together via one or several features. In some embodiments, the layers 920, 922, 924 of the side-lit LED assembly 900 can be held together via one or several retaining clips 932. The one or several retaining clips can comprise a variety of shapes and sizes and can be made from a variety of materials.

Figure 11:
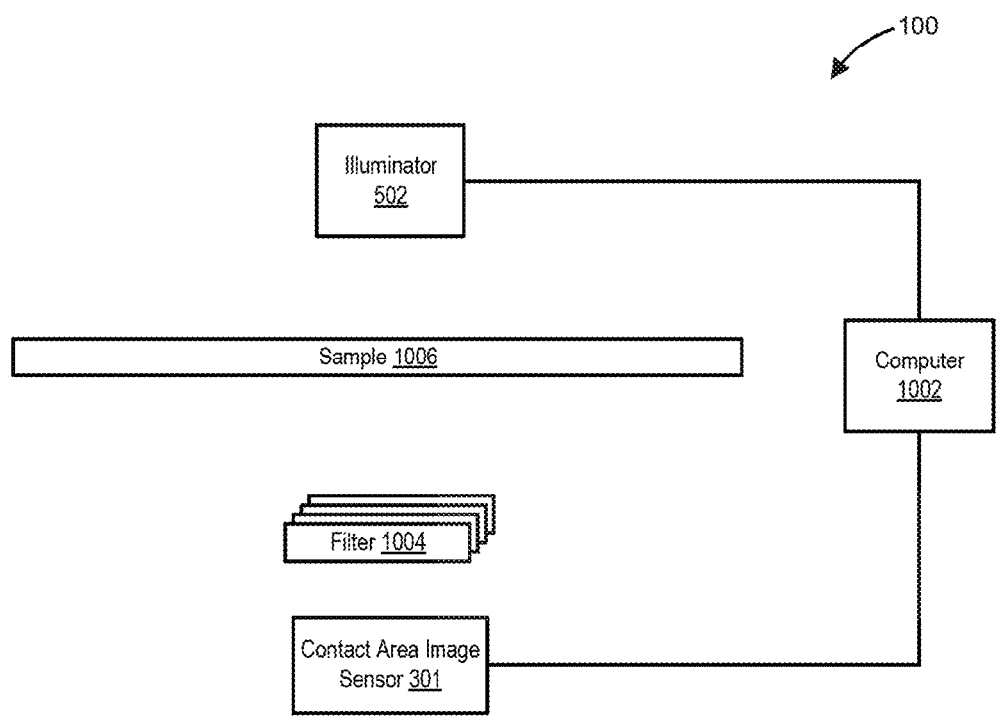
FIG. 11 is a schematic illustration of one embodiment of the contact imaging system.

FIG. 11 is a schematic illustration of one embodiment of the contact imaging system 500. The contact imaging system 500 includes the contact area image sensor 301, the illuminator 502, and at least one computer 1002, also referred to herein as a controller 1002. In some embodiments, the contact imaging system 500 can further include one or several filters 1004. In some embodiments, the filters 1004 can be used to filter undesired light frequencies.

The computer 1002 can be communicatingly connected with the contact area image sensor 301 and/or with the illuminator 502. The computer 1002 can be configured to generate signals to control operation of the contact area image sensor 301 and/or the illuminator 502, and/or receive signals from the contact area image sensor 301 and/or the illuminator 502. In some embodiments, for example, the computer 1002 can receive data from the contact area image sensor 301 comprising one or several images of a sample 1006. This can include, for example, an image of the resolved sample and an image of the standards. In some embodiments, the image of the resolved sample and the image of the standards can comprise a single image containing both the resolved sample and the standards, and in other embodiments, the image of the resolved sample can be distinct from the image of the standards.

In some embodiments, the image of the resolved sample can be generated from chemiluminesce and/or phosphorescence of the resolved sample. In some embodiments, the image of the standards can be generated using light from the illuminator 502. In some embodiments, this light from the illuminator 502 can be controllably generated such as, for example, when the illuminator 502 is an electroluminescent sheet, the 2-D array of LEDs, and/or the side-lit LED assembly 900. In such an embodiment, the controller 1002 can direct the contact area image sensor 301 to generate a first image when light is not generated by the illuminator 502, and to generate a second image when light is generated by the illuminator 502. In some embodiments, the controller 1002 can control the illuminator 502 such that the illuminator 502 generates light, and then the controller 1002 can direct the contact area image sensor 301 to generate the second image.

Figure 12:
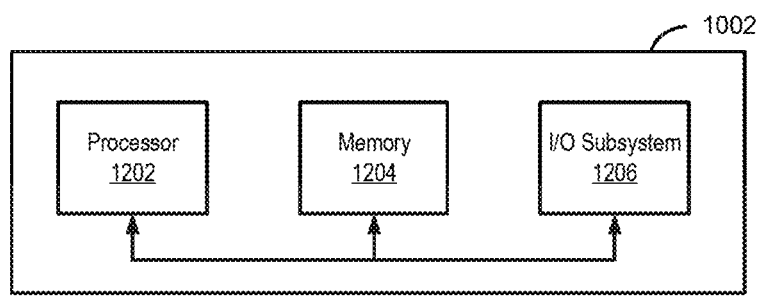
FIG. 12 is a schematic illustration of one embodiment of the computer.

FIG. 12 is a schematic illustration of one embodiment of the computer 1002. The computer 1002 can comprise one or several processors 1202, memory 1204, and an input/output ("I/O") subsystem 1206.

The processor 1202, which may be implemented as one or more integrated circuits (e.g., a conventional microprocessor or microcontroller), controls the operation of the computer 1002 and of the other components of the system 500 including the illuminator 502 and the contact area image sensor 301. One or more processors, including single core and/or multicore processors, may be included in the processor 1202. Processor 1202 may be implemented as one or more independent processing units with single or multicore processors and processor caches included in each processing unit. In other embodiments, processor 1202 may also be implemented as a quad-core processing unit or larger multicore designs (e.g., hexa-core processors, octo-core processors, ten-core processors, or greater.

Processor 1202 may execute a variety of software processes embodied in program code, and may maintain multiple concurrently executing programs or processes. At any given time, some or all of the program code to be executed can be resident in processor(s) 1202 and/or in memory 1204. In some embodiments, computer 1002 may include one or more specialized processors, such as digital signal processors (DSPs), outboard processors, graphics processors, application-specific processors, and/or the like.

The computer 1002 may comprise memory 1204, comprising hardware and software components used for storing data and program instructions, such as system memory and computer-readable storage media. The system memory and/or computer-readable storage media may store program instructions that are loadable and executable on processor 1202, as well as data generated during the execution of these programs.

Depending on the configuration and type of computer 1002, system memory may be stored in volatile memory (such as random access memory (RAM)) and/or in non-volatile storage drives (such as read-only memory (ROM), flash memory, etc.). The RAM may contain data and/or program modules that are immediately accessible to and/or presently being operated and executed by processor 1202. In some implementations, system memory may include multiple different types of memory, such as static random access memory (SRAM) or dynamic random access memory (DRAM). In some implementations, a basic input/output system (BIOS), containing the basic routines that help to transfer information between elements within computer 1002, such as during start-up, may typically be stored in the non-volatile storage drives. By way of example, and not limitation, system memory may include application programs, such as client applications, Web browsers, mid-tier applications, server applications, etc., program data, and an operating system.

Memory 1204 also may provide one or more tangible computer-readable storage media for storing the basic programming and data constructs that provide the functionality of some embodiments. Software (programs, code modules, instructions) that when executed by a processor provide the functionality described herein may be stored in memory 1204. These software modules or instructions may be executed by processor 1202. Memory 1204 may also provide a repository for storing data used in accordance with the present invention.

Memory 1204 may also include a computer-readable storage media reader that can further be connected to computer-readable storage media. Together and, optionally, in combination with system memory, computer-readable storage media may comprehensively represent remote, local, fixed, and/or removable storage devices plus storage media for temporarily and/or more permanently containing, storing, transmitting, and retrieving computer-readable information.

Computer-readable storage media containing program code, or portions of program code, may include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer 1002.

By way of example, computer-readable storage media may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media may include, but is not limited to, Zip® drives, flash memory cards, universal serial bus (USB) flash drives, secure digital (SD) cards, DVD disks, digital video tape, and the like. Computer-readable storage media may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer 1002.

The input/output module 1206 (I/O module 1206 or I/O subsystem 1206) can be configured to receive inputs from the user of the system 500 and to provide outputs to the user of the system 500. In some embodiments, the I/O subsystem 1206 may include device controllers for one or more user interface input devices and/or user interface output devices. User interface input and output devices may be integral with the computer 1002 (e.g., integrated audio/video systems, and/or touchscreen displays). The I/O subsystem 1206 may provide one or several outputs to a user by converting one or several electrical signals to user perceptible and/or interpretable form, and may receive one or several inputs from the user by generating one or several electrical signals based on one or several user-caused interactions with the I/O subsystem 1206 such as the depressing of a key or button, the moving of a mouse, the interaction with a touchscreen or trackpad, the interaction of a sound wave with a microphone, or the like.

Input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices may also include three dimensional (3D) mice, joysticks or pointing sticks, gamepads and graphic tablets, and audio/visual devices such as speakers, digital cameras, digital camcorders, portable media players, webcams, image scanners, fingerprint scanners, capture structure code reader 3D scanners, 3D printers, laser rangefinders, and eye gaze tracking devices. Additional input devices may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from the computer 1002 to a user or other computer. For example, output devices may include, without limitation, a variety of display devices that visually convey text, graphics, and audio/video information such as monitors, printers, speakers, headphones, automotive navigation systems, plotters, voice output devices, and modems.

Figure 13:
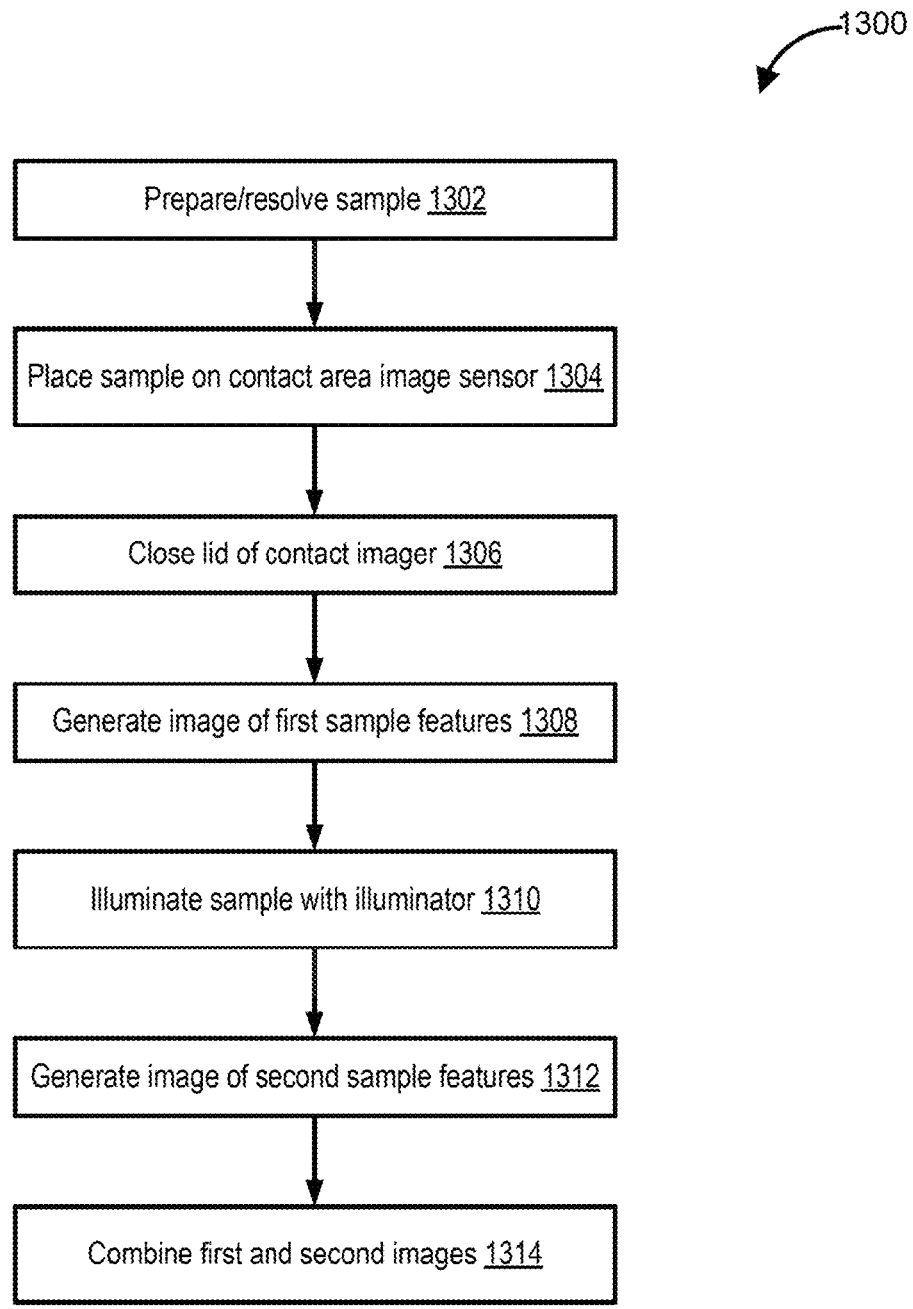
FIG. 13 is a flowchart illustrating one embodiment of a process for controlling a contact imaging system.

FIG. 13 is a flowchart illustrating one embodiment of a process 1300 for controlling a contact imaging system 500. The process can be performed by all or portions of the contact imaging system 500, including the contact area image sensor 301, the illuminator 502, and the computer 1002. The process 1300 begins at block 1302, wherein a sample is prepare and/or resolved. In some embodiments, this can include loading the sample on a gel or membrane, and performing electrophoresis to resolve the sample. At block 1304, the sample is loaded on the contact area image sensor 301 of the contact image system 500. At block 1306, the lid 202 is closed and/or is moved to the closed position. In some embodiments, this movement of the lid to the closed position can prevent and/or limit ambient light from reaching the contact area image sensor 301.

At block 1308, an image of first features of the sample is generated. In some embodiments, this can include the computer 1002 generating one or several control signals directing the contact area image sensor 301 to generate an image, and receiving image data at the computer 1002 from the contact area image sensor 301. In some embodiments, this first image can capture chemiluminescent and/or phosphorescent light generated by the resolved sample.

At block 1310, the sample is illuminated with the illuminator 502. In some embodiments in which the illuminator comprises a phosphorescent sheet, this illumination can be constant while the lid 202 is closed. In embodiments in which the illuminator 502 comprises an electroluminescent sheet, 2-D LED array, and/or a side-lit LED assembly 900, illuminating the sample with the illuminator 502 can include the computer 1002 controlling the illuminator 502 to illuminate the sample. In some embodiments, the computer 1002 can generate one or several signals controlling the generation of illumination by the illuminator 502.

At block 1312, an image of second features of the sample, can be captured. In some embodiments, this can include the computer 1002 generating one or several control signals directing the contact area image sensor 301 to generate an image, and receiving image data at the computer 1002 from the contact area image sensor 301. In some embodiments, this image can capture second features of the sample, and specifically can capture the standards. In some embodiments, the step of block 1312 can be performed simultaneous with the performing of the step of block 1310, or in other words, the image of the second features can be generated while the sample is illuminated with the illuminator 502.

In some embodiments, illuminating the sample with the illuminator 502 can include coupling the illuminator 502 to the lid 202 of the imaging device 200. In some embodiments, the illuminator 502 can be coupled to the lid 202 via one or several retention features. In some embodiments, these one or several retention features can comprise the one or several sheet guides 506. In some embodiments, illuminating the sample with the illuminator 502 can include coupling, via the one or several sheet guides 506, the light-emitting sheet 502 to the lid 202 via the one or several sheet guides 506. In some embodiments, coupling the illuminator 502 to the lid 202 can further include the establishing of a connection such that the computer 1002 can control the operation of the illuminator 502.

In some embodiments, the illumination of the sample can comprise transillumination of the sample, and the generated image can reflect the absorbance spectrum of the standards. In some embodiments, the image of the second features can be generated at the same time as the image of the first features, or in other words, a single image can capture both the first and second features. In some embodiments, this can occur when the illuminator comprises one or several phosphorescent sheets that constantly illuminate the sample. In some embodiments, the image of the first features can comprise a first image and the image of the second features can comprise a second image. In some embodiments, the first and second images can be captured at different times.

In the event that separate first and second images are captured, in some embodiments, and as indicated in block 1314, the first and second images can be combined into a single image. In some embodiments, the first and second images can be combined by the computer 1002.

This description should not be interpreted as implying any particular order or arrangement among or between various steps or elements except when the order of individual steps or arrangement of elements is explicitly described. Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A contact imaging system, comprising:
   a contact imager comprising:
      a housing having a base and a lid, the lid having a closed position against the base and having an open position; and
      a contact area image sensor located in the base, wherein the lid shields the contact area image sensor from ambient light when the lid is in the closed position; and
   an illuminator configured to illuminate at least a portion of a blot on the contact area image sensor when the lid is in the closed position.

2. The contact imaging system of claim 1, wherein the illuminator is a component of the contact imager.

3. The contact imaging system of claim 1, wherein the illuminator is configured to illuminate at least the portion of the blot with visible light.

4. The contact imaging system of claim 3, wherein the illuminator comprises a 2-D LED array.

5. The contact imaging system of claim 4, wherein the 2-D LED array is located in the lid of the contact imager.

6. The contact imaging system of claim 4, wherein the 2-D LED array is configured to generate illumination at at least one desired frequency.

7. The contact imaging system of claim 3, wherein the illuminator comprises a side-lit assembly located in the contact imager.

8. The contact imaging system of claim 7, wherein the side-lit assembly is located in the lid of the contact imager.

9. The contact imaging system of claim 8, wherein the side-lit assembly comprises:
   at least one Light emitting diode (LED) strip comprising a plurality of LEDs; and
   a total internal reflection (TIR) layer configured to cover the contact area image sensor when the lid is in the closed position, wherein the TIR layer is configured to receive light from the LED strip and distribute this light across the contact area image sensor.

10. The contact imaging system of claim 9, wherein the side-lit assembly further comprises:
    a reflecting layer coupled to a top of the TIR layer; and
    at least one distribution layer coupled to a bottom of the TIR layer such that the at least one distribution layer is between the TIR layer and the contact area image sensor when the lid is in the closed position.

11. The contact imaging system of claim 10, wherein the at least one distribution layer comprises a diffusion layer.

12. The contact imaging system of claim 11, wherein the at least one distribution layer further comprises a prism layer having a first orientation, and a second prism layer having a second orientation.

13. The contact imaging system of claim 12, wherein the first orientation is orthogonal to the second orientation.

14. The contact imaging system of claim 3, further comprising at least one processor configured to:
    generate a first image of first sample features with the contact area image sensor, wherein the first image is of a resolved sample and is generated with light emitted by chemiluminescence of the sample;
    generate a second image of second sample features with the contact area image sensor; the second sample features comprising standards.

15. The contact imaging system of claim 14, wherein the first image and the second image are the same image.

16. The contact imaging system of claim 14, wherein the first image and the second image are separate images captured at different times.

17. The contact imaging system of claim 16, the at least one processor can be further configured to combine the first image and the second image.

18. The contact imaging system of claim 14, wherein the second image is generated with light from the illuminator transilluminating the sample.

19. The contact imaging system of claim 18, wherein the at least one processor is further configured to control the illuminator to transilluminate the sample before generating the second image.

20. A method of imaging a sample, the method comprising:
    placing a resolved sample on a contact area image sensor, the contact area image sensor located in a base of a contact imager;
    moving a lid of the contact area image sensor to a closed position, wherein in the closed position, the lid prevents ambient light from reaching the contact area image sensor;
    generating, with the contact area image sensor, a first image of first sample features, wherein the first image is of the resolved sample and is generated with light emitted by the sample;
    illuminating the resolved sample with an illuminator of the contact imager, the illuminator configured to illuminate at least a portion of the contact area image sensor when the lid is in the closed position; and
    generating, with the contact area image sensor, a second image of second sample features while the lid is in the closed position, the second sample features comprising standards, wherein the second image of the second sample features is generated while the resolved sample is illuminated.

21. The method of claim 20, wherein the sample is electrophoretically resolved, and wherein the light emitted by the sample is generated via chemiluminescence.

22. The method of claim 21, wherein the illuminator transilluminates the sample.

\* \* \* \* \*